(12) United States Patent
Tanahashi et al.

(10) Patent No.: US 7,364,608 B2
(45) Date of Patent: Apr. 29, 2008

(54) CHEMICAL FILTER AND METHOD FOR MANUFACTURING SAME

(75) Inventors: Takashi Tanahashi, Yokohama (JP); Toshiro Nakano, Yokohama (JP); Akihiro Imai, Yokohama (JP)

(73) Assignee: Nichias Corporation, Tokyo (JP)

( * ) Notice: Subject to any disclaimer, the term of this patent is extended or adjusted under 35 U.S.C. 154(b) by 373 days.

(21) Appl. No.: 11/032,035

(22) Filed: Jan. 11, 2005

(65) Prior Publication Data

US 2005/0211625 A1    Sep. 29, 2005

(30) Foreign Application Priority Data

Mar. 29, 2004 (JP) .............................. 2004-096716

(51) Int. Cl.
*B01D 53/02* (2006.01)

(52) U.S. Cl. ............ 96/108; 55/524; 55/DIG. 45; 95/285; 96/129; 96/134; 96/135; 96/154; 210/504; 210/506; 427/430.1

(58) Field of Classification Search .......... 55/DIG. 45, 55/521, 524, 527, 484; 95/285; 96/108, 96/129, 134, 135, 154; 210/291, 502.1, 504, 210/505; 427/430.1
See application file for complete search history.

(56) References Cited

U.S. PATENT DOCUMENTS

| | | | | |
|---|---|---|---|---|
| 6,146,451 | A  * | 11/2000 | Sakata et al. | .................. 96/135 |
| 6,352,579 | B1 * | 3/2002 | Hirata et al. | .................. 96/134 |
| 6,703,103 | B2 * | 3/2004 | Tanaka et al. | .............. 428/116 |
| 2001/0029843 | A1 * | 10/2001 | Tanaka et al. | |

FOREIGN PATENT DOCUMENTS

| | | |
|---|---|---|
| JP | 2000-5544 | 1/2000 |
| JP | 2001-259339 | 9/2001 |
| JP | 2003-10613 | 1/2003 |

* cited by examiner

*Primary Examiner*—Duane Smith
*Assistant Examiner*—Sonji Turner
(74) *Attorney, Agent, or Firm*—Oblon, Spivak, McClelland, Maier & Neustadt, P.C.

(57) ABSTRACT

The chemical filter supporting an ion-exchange resin comprising a fiber supporting body containing ion-exchange fiber and ion-exchange resin powder which is supported on the fiber supporting body is provided. The chemical filter possesses a large ion-exchange capacity per unit volume and exhibits high initial performance of eliminating ionized gaseous pollutants and excellent durability of the elimination performance.

15 Claims, 2 Drawing Sheets

CHEMICAL FILTER AND METHOD FOR MANUFACTURING SAME

TECHNICAL FIELD

The present invention relates to a chemical filter for cleaning air installed in a clean room or production unit in manufacturing plants of semiconductors, liquid crystals, precision electronic components, and the like and to a method for manufacturing the chemical filter. More particularly, the present invention relates to a chemical filter for removing ionized gaseous pollutants from the air generated in a clean room or production unit and to a method for manufacturing the chemical filter.

BACKGROUND ART

In frontier industries such as the semiconductor manufacturing industry and liquid crystal manufacturing industry, controlling pollution of air and product surfaces in clean rooms is important to ensure a high yield, high quality, and product reliability. In the semiconductor manufacturing industry, in particular, as the degree of integration of the products increases, control of ionized gaseous pollutants has become indispensable in addition to the control of particulate matters using a HEPA filter, ULPA, and the like.

The ionized gaseous pollutants include basic gases and acidic gases. Of these gases, the basic gases such as ammonia are known to adversely affect resolution during the step of exposure to radiation and cause wafer surfaces to become clouded in the manufacture of semiconductor devices. $SO_x$, which is an acidic gas, produces lamination defects in substrates in the thermal oxidation film-forming process during manufacture of semiconductors, whereby the characteristics and reliability of the semiconductor devices are adversely affected.

Since ionized gaseous pollutants cause various problems in semiconductor manufacturing processes and the like in this manner, it is demanded to reduce the concentration of the ionized gaseous pollutants in a clean room used in semiconductor manufacturing and the like to a concentration of several $\mu g/m^3$ or less.

A conventional practice for removing the ionized gaseous pollutants has been to introduce ion-exchange groups into a chemical filter. Japanese Patent Application Laid-open No. 2001-259339 (Patent Document 1) discloses an air filter material made of paper comprising a matrix and ion-exchange resin powder having a particle size and ion-exchange capacity in specific ranges incorporated into the matrix.

Japanese Patent Application Laid-open No. 2000-5544 (Patent Document 2) discloses a deodorant comprising an adsorption medium and an ion-exchange resin.

Japanese Patent Application Laid-open No. 2003-10613 (Patent Document 3) discloses an air filter medium for filtering ionized alkaline gases, wherein the substrate of the filter medium contains fine particles, granules, or fiber made of a cation-exchange resin, on which phosphoric acid is supported.

In addition to the initial target performance of eliminating ionized gaseous pollutants to a concentration of several $\mu g/m^3$ or less, the air filter is required to possess excellent durability, specifically, to exhibit elimination performance for a long period of time. Therefore, a large amount of ion-exchange resin must be introduced to increase the ion-exchange capacity per unit volume of the chemical filter.

However, in the air filter material described in Japanese Patent Application Laid-open No. 2001-259339, if a large amount of fine particles of ion-exchange resin is attached to the pulp matrix, the fine particles of ion-exchange resin are easily detached from the matrix because the fine particles are retained on the surface of the matrix by means of an electrostatic force or frictional force between the pulp matrix and the fine particles of ion-exchange resin.

The deodorant described in Japanese Patent Application Laid-open No. 2000-5544 comprises a mixture of activated carbon and an ion-exchange resin milled into paper. Since an increased amount of the ion-exchange resin mixed with activated carbon unduly impairs the strength of the resulting deodorant obtained by paper-milling, the deodorant may collapse during aeration or milling of the paper is impossible.

The air filter material described in Japanese Patent Application Laid-open No. 2003-10613 has the same problem of difficulty in incorporating a large amount of ion-exchange resin into the filter substrate as the deodorant of Japanese Patent Application Laid-open No. 2000-5544. In addition, since the filter material can eliminate ionized gaseous pollutants by the neutralization reaction of phosphoric acid supported on the air filter with the ionized gaseous pollutants, the salt generated by the neutralization reaction may inhibit processed gas from diffusing in spaces in filter fibers, which results in a decrease in the life of the filter material.

An object of the present invention is, therefore, to provide a chemical filter possessing a large ion-exchange capacity per unit volume, exhibiting high initial performance of eliminating ionized gaseous pollutants, and exhibiting excellent durability in elimination performance.

DISCLOSURE OF THE INVENTION

As a result of extensive studies to solve the problems related to the prior art, the present inventors have found that (1) if a carrier containing ion-exchange fiber is used, the ion-exchange fiber bonds to the ion-exchange resin powder by a hydrogen bond, whereby the force of the fiber supporting body for drawing the ion-exchange resin powder increases, (2) the resulting increase in the bonding force of the fiber supporting body with ion-exchange resin powder can prevent detachment of the ion-exchange resin powder, which increases the amount of the ion-exchange resin powder that can be supported, and (3) a large amount of ion-exchange resin powder can be supported due to easy permeation of the ion-exchange resin powder into fiber voids which are present deep in the fiber supporting body when the ion-exchange resin powder is supported. These findings have led to the completion of the present invention.

Specifically, the present invention (1) provides a chemical filter supporting an ion-exchange resin comprising a fiber supporting body containing ion-exchange fiber and an ion-exchange resin powder which is supported on the fiber supporting body.

The present invention (2) provides a chemical filter supporting an ion-exchange resin of the invention (1) above, wherein the fiber supporting body has a corrugated-honeycomb structure.

The present invention (3) provides a method for manufacturing a chemical filter supporting an ion-exchange resin comprising blowing a slurry containing ion-exchange resin powder onto a fiber supporting body which contains ion-exchange fiber.

The present invention (4) provides a method for manufacturing a chemical filter supporting an ion-exchange resin comprising dipping a fiber supporting body which contains ion-exchange fiber in a slurry containing ion-exchange resin powder.

Since the chemical filter supporting an ion-exchange resin of the present invention possesses a large ion-exchange capacity per unit volume, the chemical filter exhibits high initial performance of eliminating ionized gaseous pollutants and excellent durability in elimination performance. The method for manufacturing the chemical filter of the present invention is suitable for use in manufacturing the chemical filter supporting an ion-exchange resin of the present invention.

DETAILED DESCRIPTION

Figure 1:
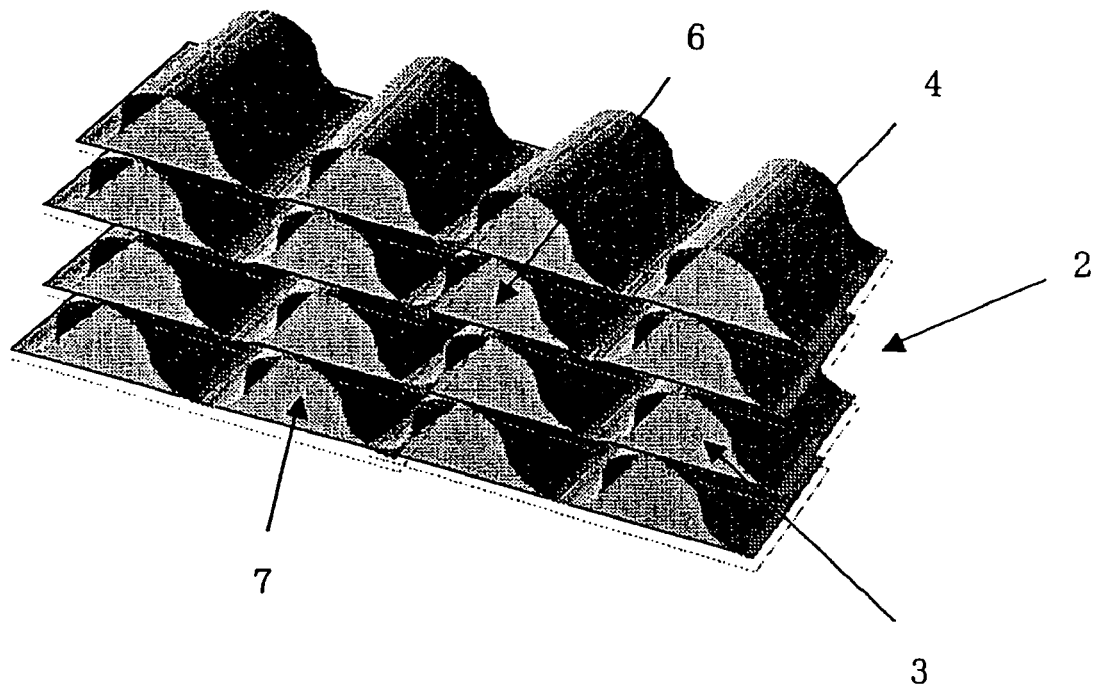
FIG. 1 is a schematic perspective view of the chemical filter made of a fiber supporting body with a corrugated honeycomb structure.

The chemical filter supporting an ion-exchange resin comprises a fiber supporting body containing ion-exchange fiber and an ion-exchange resin powder which is supported on the fiber supporting body.

Either cation-exchange fiber or anion-exchange fiber can be used as the ion-exchange fiber without any specific limitation. As the cation-exchange fiber, strongly acidic cation-exchange fiber, weakly acidic cation-exchange fiber, and the like can be mentioned. As the ion-exchange group introduced into the cation-exchange fiber, a sulfonic acid group, phosphonic acid group, carboxylic acid group, and the like can be given. As the anion-exchange fiber, strongly basic anion-exchange fiber, weakly basic anion-exchange fiber, and the like can be mentioned. As the ion-exchange group introduced into the anion-exchange fiber, a trimethyl ammonium group, dimethylethanol ammonium group, and the like can be given. As the material for the ion-exchange fiber, polystyrene fiber, polyacrylonitrile fiber, polyvinylalcohol fiber, and the like can be given without any specific limitation. The ion-exchange fiber used in the present invention may be a single ion-exchange fiber, a combination of two or more types of cation-exchange fiber, a combination of two or more types of anion-exchange fiber, or a combination of cation-exchange fiber and anion-exchange fiber.

The amount of the ion-exchange fiber in the fiber supporting body is 20-80 wt %, and preferably 40-60 wt %. If the amount is less than 20 wt %, the force of the chemical filter for drawing the ion-exchange resin powder is weak, giving rise to easy desorption of ion-exchange resin powder. In addition, capability of the chemical filter to eliminate ionized gaseous pollutants is impaired. If the amount exceeds 80 wt %, the mechanical strength of the resulting fiber supporting body decreases due to low mechanical strength of the ion-exchange fiber.

There are no specific limitations to the ion-exchange capacity of the ion-exchange fiber. The ion-exchange capacity is preferably 1-5 meq/g, and still more preferably 2-4 meq/g. If the ion-exchange capacity is less than 1 meq/g, the force of the chemical filter for drawing the ion-exchange resin powder is weak, giving rise to easy desorption of the ion-exchange resin powder. In addition, capability of the chemical filter to eliminate ionized gaseous pollutants is impaired. If the ion-exchange capacity is more than 5 meq/g, the mechanical strength of the resulting fiber supporting body decreases due to an undue decrease in the mechanical strength of the ion-exchange fiber.

Although there are no specific limitations, the average fiber diameter of the ion-exchange fiber is preferably 1-100 μm, and still more preferably 10-50 μm. Although there are no specific limitations, the average fiber length of the ion-exchange fiber is preferably 0.1-50 mm, and still more preferably 1-10 mm.

The fiber supporting body is prepared by forming a woven or nonwoven fabric, which is formed from the ion-exchange fiber and reinforcing fiber, into a honeycomb structure. The woven or nonwoven fabric can be obtained by milling a mixture of the ion-exchange fiber and reinforcing fiber into paper or by dry-pressing of such a mixture.

Any reinforcing fibers that are commonly used for the manufacture of chemical filters can be used without any specific limitation. Inorganic reinforcing fibers such as silica alumina fiber, silica fiber, alumina fiber, mullite fiber, glass fiber, rock wool fiber, and carbon fiber; and organic reinforcing fibers such as polyethylene fiber, polypropylene fiber, nylon fiber, polyester fiber, polyvinyl alcohol fiber, aramid fiber, pulp fiber, and rayon fiber can be given as examples. These reinforcing fibers may be used either individually or in combination of two or more. A combination of inorganic fiber and organic fiber is preferable to increase the mechanical strength of the chemical filter. A combination of silica alumina fiber and rayon fiber is particularly preferable.

Although there are no specific limitations, the average diameter of the reinforcing fiber is preferably in the range of 0.1-25 μm, and more preferably 0.5-10 μm, and the average fiber length is preferably in the range of 0.1-50 mm, and more preferably 10-20 mm. The average diameter and length of the reinforcing fiber in the above range can increase the mechanical strength of the fiber supporting body.

Although there are no specific limitations, the fiber void ratio in the woven or nonwoven fabric formed from the ion-exchange fiber and reinforcing fiber is preferably 50-95%, and more preferably 70-95%. The fiber void ratio refers to the proportion of the difference between the apparent volume of woven or nonwoven fabric and the volume of fibers in the woven or nonwoven fabric (such a difference is referred to as "fiber void" from time to time) to the apparent volume of woven or nonwoven fabric. The fiber void ratio in the above range ensures ion-exchange resin powder to be supported not only on the outside surface of the fiber supporting body, but also in the fiber voids, whereby the amount of the ion-exchange resin powder supported on the fiber supporting body increases. Although there are no specific limitations, the thickness of the woven or nonwoven fabric is preferably 0.1-0.5 mm, and still more preferably 0.2-0.3 mm. The thickness in the above range increases the mechanical strength of the fiber supporting body and the amount of ion-exchange resin powder retained in the fiber void of the fiber supporting body.

The fiber supporting body can be obtained by forming the woven or nonwoven fabric (hereinafter referred to as "fiber material" from time to time) by a conventional method. There are no specific limitations to the form of the fiber supporting body. Examples that can be given include a structure obtained by alternately laminating a corrugated fiber material and a flat fiber material (corrugated-honeycomb structure) and a structure obtained by alternately laminating a pleat form fiber material processed into a wave form and a flat fiber material in the right-angled direction to the direction of air flow. Of these, the corrugated honeycomb structure is preferable due to its capability of allowing the flow path of the process air to run parallel to the airflow direction, which ensures a low pressure drop, use of compact peripheral equipment, and cost reduction.

The corrugated honeycomb structure will be explained referring to FIG. 1 and FIG. 2. FIG. 1 is a schematic perspective view of the fiber supporting body with a corrugated honeycomb structure. The fiber supporting body 2 is made from a flat fiber material 3 containing the ion-exchange fiber and corrugated fiber material 4 which are alternately laminated. A cavity 6 with an almost semicircular column extending in the direction in which mountains 5 of the corrugated fiber material 4 continuously lie in a row is formed between the flat fiber material 3 and corrugated fiber material 4. The cavity 6 allows process air to flow through.

The flat fiber paper 3 is a flat material made of woven or nonwoven fabric, which is formed from the ion-exchange fiber and the reinforced fiber. The corrugated fiber material 4 is a wave-form material obtained by a corrugating process of the flat material made of woven or nonwoven fabric. Corrugating process is a process for fabricating the flat fiber material 3 into a waveform object by passing the flat fiber material through a pair of upper and lower corrugated rolls.

The fiber supporting body 2 can be prepared by alternately laminating the flat fiber material 3 and the corrugated fiber material 4 using the corrugated fiber material 4 as a core. In this instance, the flat fiber material 3 and the corrugated fiber material 4 of the core may be integrated by causing upper mountains 5 and lower mountains 5 on the corrugated fiber material 4 (the core) to adhere to the flat fiber material 3 using an adhesive, or a laminated body of the flat fiber material 3 and the corrugated fiber material 4 may be secured in a frame without adherence. As the adhesive used for adhering the flat fiber material 3 to the corrugated fiber material 4, the same type of inorganic adhesives as those mentioned later such as silica sol can be given.

Figure 2:
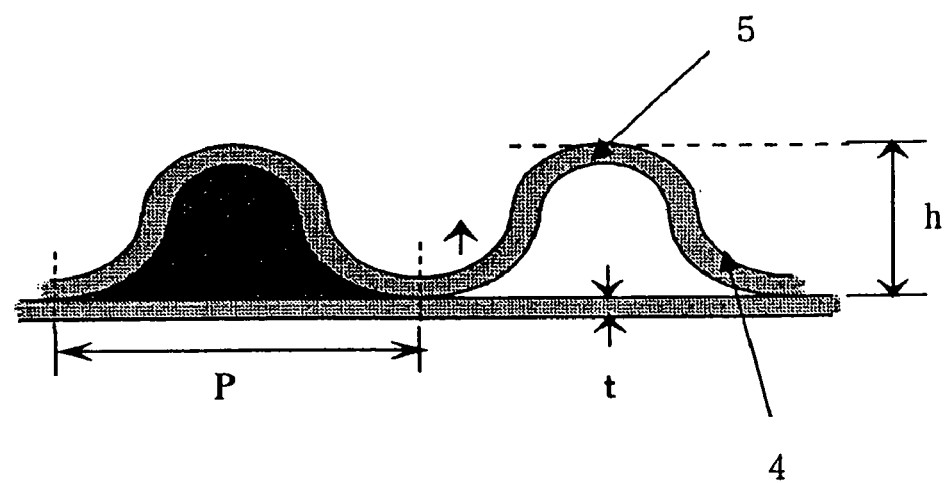
FIG. 2 is a schematic cross-sectional view of the chemical filter made of a fiber supporting body with a corrugated honeycomb structure.

FIG. 2 is a schematical cross-sectional view of the fiber supporting body 2 along the plane parallel to an opening 7. In the FIG. 2, the mountain 5 of the corrugated fiber material 4 is caused to adhere to the flat fiber material 3. Although there are no specific limitations, the height of the mountain (h in FIG. 2) of the fiber supporting body 2 is preferably 0.5-10 mm, more preferably 1-5 mm, and still more preferably 1-2 mm. Although there are no specific limitations, the pitch (p in FIG. 2) of the fiber supporting body 2 is preferably 1-20 mm, more preferably 1-5 mm, and still more preferably 2-4 mm. The mountain height and the pitch in the above ranges are preferable to maintain a good balance between the removal efficiency of ionized gaseous pollutant and the pressure loss.

Either cation-exchange resin powder or anion-exchange resin powder can be used as the ion-exchange resin powder without any specific limitation. As the cation-exchange resin powder, strongly acidic cation-exchange resin powder, weakly acidic cation-exchange resin powder, and the like can be mentioned. As the anion-exchange resin powder, strongly basic anion-exchange resin powder, weakly basic anion-exchange resin powder, and the like can be mentioned. The same ion-exchange groups and materials for ion-exchange resin powder as previously mentioned for the ion-exchange fibers can be given as those to be introduced into or used for the cation-exchange resin powder or the anion-exchange resin powder. The ion-exchange resin powder used in the present invention may be a single ion-exchange resin powder, a combination of two or more types of cation-exchange resin powder, a combination of two or more types of anion-exchange resin powder, or a combination of cation-exchange resin powder and anion-exchange resin powder.

The amount of the ion-exchange resin powder supported per unit volume of the chemical filter supporting the ion-exchange resin is 50-200 kg/m$^3$, preferably 100-180 kg/m$^3$, and particularly preferably 130-160 kg/m$^3$. If this amount is less than 50 kg/m$^3$, the durability of the chemical filter for eliminating ionized gaseous pollutants is impaired; if more than 200 kg/m$^3$, the ion-exchange resin powder is easily detached.

Although there are no specific limitations, the average particle diameter of the ion-exchange resin powder is preferably 1-150 µm, and particularly preferably 10-50 µm. A small average particle diameter reduces the weight per one particle, whereby the ion-exchange resin powder can easily attach to the fiber supporting body and can detaches there from only with difficulty. However, if the average particle diameter is less than 1 µm, the size of the ion-exchange resin powder particles for the fiber voids is too small. As a result, particles of the ion-exchange resin powder can easily escape from fiber voids and are easily detached from the fiber supporting body. If the average diameter is more than 150 µm, on the other hand, the weight of each particle is too large to have sufficient adhesion strength, which may result in easy detachment of the ion-exchange resin powder.

There are no specific limitations to the ion-exchange capacity of the ion-exchange resin powder. The ion-exchange capacity is preferably 1-10 meq/g, and particularly preferably 3-6 meq/g. If the ion-exchange capacity is less than 1 meq/g, the ability of the chemical filter to eliminate ionized gaseous pollutants is impaired; if more than 10 meq/g, the ion-exchange group of the ion-exchange resin powder becomes chemically unstable.

When the ionized gaseous pollutants contain both basic gases and acidic gases, ion-exchange resin powder containing both cation-exchange resin powder and anion-exchange resin powder is preferable. The weight ratio of the cation-exchange resin powder and the anion-exchange resin powder is preferably 2:8-8:2, and particularly preferably 4:6-6:4. If the weight ratio is outside the above range, either the performance in eliminating basic gases or the performance in eliminating acidic gases of the chemical filter tends to decrease.

In respect of the combination of the ion-exchange fiber and the ion-exchange resin powder, to ensure high elimination performance, anion-exchangers are preferably used for both the ion-exchange fiber and the ion-exchange resin powder when the ionized gaseous pollutants contain only basic gases, and cation-exchangers are preferably used for both the ion-exchange fiber and the ion-exchange resin powder when the ionized gaseous pollutants contain only acidic gases. When the ionized gaseous pollutants contain both basic gases and acidic gases, it is preferable for ensuring high elimination performance to use an anion-exchanger in either the ion-exchange fiber or the ion-exchange resin powder, with the other being a cation-exchanger, or to use a combination of an anion-exchanger and a cation-exchanger for either one or both of the ion-exchange fiber and the ion-exchange resin powder.

The ion-exchange resin powder is supported in fiber voids or on the outside surface of the fiber supporting body using an adhesive. Either an inorganic adhesive or organic adhesive can be used without any specific limitation. As the inorganic adhesive, silica sol, alumina sol, titania sol, sodium silicate, potassium silicate, and the like can be given.

As the organic adhesive, acrylic resin, vinyl-acetate resin, epoxy resin, phenol resin, silicone resin, their copolymer resins, and the like can be given. Of these, inorganic adhesives are preferable because the cured products of the inorganic adhesives do not produce films but produce aggregates which provide spaces through which ionized gaseous pollutants can easily permeate and be removed at a high rate.

The ion-exchange capacity per unit volume of the chemical filter supporting the ion-exchange resin is 500-1200 $eq/m^3$, preferably 600-1000 $eq/m^3$, and particularly preferably 700-900 $eq/m^3$.

In such a chemical filter supporting the ion-exchange resin in which the fiber supporting body contains ion-exchange fiber, since the ion-exchange fiber bonds to the ion-exchange resin powder via hydrogen bonding, the force of the fiber supporting body for drawing the ion-exchange resin powder increases. For this reason, the ion-exchange resin powder detaches only with difficulty even if a large amount is supported. Since the chemical filter supporting the ion-exchange resin of the present invention contains a large amount of the ion-exchange resin powder supported thereon in this manner, the chemical filter has a larger ion-exchange capacity per unit volume. Therefore, the chemical filter supporting the ion-exchange resin can be suitably used for chemical filters for air purification to eliminate ionized gaseous pollutants to a concentration of 1 $\mu g/m^3$ or less. The chemical filter possesses excellent durability in its performance of eliminating ionized gaseous pollutants.

Next, a first method for manufacturing the chemical filter supporting ion-exchange resin of the present invention (hereinafter referred to as "manufacturing method of the first embodiment) will be described. The manufacturing method of the first embodiment is a method for manufacturing the chemical filter supporting an ion-exchange resin comprising blowing a slurry containing ion-exchange resin powder onto a fiber supporting body which contains ion-exchange fiber (hereinafter referred to from time to time as "blowing treatment").

The same ion-exchange fibers as those described for the chemical filter supporting ion-exchange resin can be used in the manufacturing method of the first embodiment.

Although there are no specific limitations, the ion-exchange capacity per unit volume of the fiber supporting body used in the manufacturing method of the first embodiment is preferably 50-200 $eq/m^3$, and particularly preferably 100-150 $eq/m^3$. The ion-exchange capacity per unit volume in the above range increases the effect of the ion-exchange fiber in the fiber supporting body for drawing the ion-exchange resin powder in the slurry and ensures easy permeation of the ion-exchange resin powder into fiber voids in the fiber supporting body, resulting in an increased amount of ion-exchange resin powder retained by the fiber supporting body. If the ion-exchange capacity per unit volume is less than 50 $eq/m^3$, the ion-exchange resin powder can permeate into fiber voids of the fiber supporting body only with difficulty. If more than 200 $eq/m^3$, the mechanical strength of the fiber supporting body is impaired. In regard to other aspects, the descriptions in the explanation of the chemical filter supporting ion-exchange resin apply to the other aspects of the fiber supporting body.

The slurry used in the manufacturing method of the first embodiment contains the ion-exchange resin powder. The slurry may also contain an adhesive or other components. The slurry can be obtained by mixing the ion-exchange resin powder, adhesive, the other components, and water.

Although there are no specific limitations, the average particle diameter of the ion-exchange resin powder contained in the slurry is preferably 1-150 $\mu m$, and particularly preferably 10-50 $\mu m$. If the average particle diameter is less than 1 $\mu m$, the slurry has a high viscosity and can permeate into the fiber voids of the fiber supporting body only with difficulty, resulting in insufficiency of the amount of ion-exchange resin powder supported on the fiber supporting body. The average particle diameter more than 150 $\mu m$ is too large for the ion-exchange resin powder to permeate into the fiber voids of the fiber supporting body with ease.

There are no specific limitations to the ion-exchange capacity of the ion-exchange resin powder. The ion-exchange capacity is preferably 1-10 meq/g, and particularly preferably 3-6 meq/g. The ion-exchange capacity in the above range ensures ion-exchange resin powder to permeate into fiber voids of the fiber supporting body with ease, whereby the amount of the ion-exchange resin powder supported on the fiber supporting body increases. If the ion-exchange capacity is less than 1 meq/g, the ion-exchange resin powder can permeate into fiber voids in the fiber supporting body only with difficulty. If more than 10 meq/g, the ion-exchange group in the ion-exchange resin powder is chemically unstable. The descriptions in the explanation of the chemical filter supporting ion-exchange resin apply to the other aspects of the ion-exchange resin powder.

Although there are no specific limitations, the amount of the ion-exchange resin powder in the slurry is 10-40 wt % and preferably 20-30 wt %. If less than 10 wt %, the amount of ion-exchange resin powder supported on the fiber supporting body is insufficient; if more than 40 wt %, the slurry has a high viscosity and the ion-exchange resin powder can permeate into the fiber voids of the fiber supporting body only with difficulty.

When the ionized gaseous pollutants contain both basic gases and acidic gases, ion-exchange resin powder containing both cation-exchange resin powder and anion-exchange resin powder is preferable. The weight ratio of the cation-exchange resin powder to the anion-exchange resin powder is preferably 2:8-8:2, and particularly preferably 4:6-6:4. If the weight ratio is outside the above range, either the performance in eliminating basic gases or the performance in eliminating acidic gases of the chemical filter tends to decrease.

The same adhesive as described in the explanation of the chemical filter supporting ion-exchange resin can be used as the adhesive for the slurry.

Although there are no specific limitations to the amount of the adhesive contained in the slurry, such an amount, in terms of weight ratio of the adhesive to the ion-exchange resin powder is preferably 10:90-50:50, and particularly preferably 15:85-25:75 when the adhesive is an inorganic adhesive, and 1:99-20:80, and particularly preferably 5:95-15:85 when the adhesive is an organic adhesive. If the amount of adhesive is in the above range, the ion-exchange resin powder sufficiently adheres to the fiber supporting body and detaches only with difficulty.

Although there are no specific limitations, the total amount of the ion-exchange resin powder and adhesive is preferably 10-50 wt %, and still more preferably 20-40 wt %. The slurry containing the ion-exchange resin powder and adhesive in the above range has a suitable viscosity for the ion-exchange resin powder to be supported on the outside surface and in the fiber voids of the fiber supporting body, resulting in a chemical filter with a large amount of ion-exchange resin powder.

As the water contained in the slurry, ion-exchange water, distilled water, tap water, industrial water, and the like can be used without any specific limitation. When the adhesive contains water, the water in the adhesive may constitute a part of the slurry. For example, when the adhesive is silica sol, water in the silica sol can be a part of the water forming the slurry.

The slurry may also contain a surfactant such as a dispersant.

In the blowing treatment, the slurry is injected onto the fiber supporting body using blowing equipment such as a spraying machine that can inject the slurry in the form of mist, a shower facility which can cause the slurry to run down, and the like.

A drying process may optionally follow the blowing treatment. Although there are no specific limitations, the temperature of the drying process is preferably 50-130° C. and the drying time is preferably 30-120 minutes. The drying process is preferable for causing the ion-exchange resin powder to be rapidly and surely supported on the outside surface and in the fiber void of the fiber supporting body.

The blowing treatment may be carried out either one time or two or more times. In the latter case, the drying process is carried out between the two blowing operations to increase the amount of ion-exchange resin powder to be supported.

Next, a second method for manufacturing the chemical filter supporting ion-exchange resin of the present invention (hereinafter referred to as "manufacturing method of the second embodiment) will be described. In the following description, the same feature as in the manufacturing method of the first embodiment will be omitted, focusing the discussion to the features of the second embodiment differing from the first embodiment. The main feature in the manufacturing method of the second embodiment that differs from the first embodiment is a process of dipping the fiber supporting body in a slurry containing ion-exchange resin powder instead of the blowing treatment (hereinafter referred to from time to time as "dipping treatment").

Although there are no specific limitations, the dipping time of the dipping treatment is preferably 10-300 seconds, and particularly preferably 30-120 seconds.

The manufacturing method of the second embodiment is preferable, because it is easy to cause a large amount of ion exchange resin powder to be supported not only on the outside surface but also in the fiber voids of the fiber supporting body.

The dipping treatment can be combined with the blowing treatment.

Since the ion-exchange fiber contained in the fiber supporting body draws fine particles of the ion-exchange resin powder in the slurry by a hydrogen bond in the manufacturing method of the chemical filter of the present invention, the slurry can easily permeate into the fiber voids of the fiber supporting body. Therefore, the amount of the ion-exchange-resin powder attached can be increased in the manufacturing method of the chemical filter of the present invention.

EXAMPLES

The present invention will now be described in detail by way of examples and comparative examples, which are given as embodiments and are not intended to limit the present invention.

Example 1

Preparation of Fiber Supporting Body with Corrugated Honeycomb Structure

A mixture of strongly acidic cation exchange fiber with an ion exchange capacity of 2.0 meq/g (average fiber diameter: 30 μm, average fiber length: 5 mm), silica alumina fiber (average fiber diameter: 5 μm, average fiber length: 20 mm), and rayon fiber at a weight ratio of 50:30:20 was milled into paper by a wet milling process to obtain a flat fiber material with a fiber void ratio of 90% and a thickness (t in FIG. 2) of 0.2 mm.

A corrugated fiber material was produced by causing the flat fiber material to run through between a pair of upper and lower waveform corrugators. Silica sol was applied as an adhesive to the mountains of the corrugated fiber material.

The flat fiber material was layered onto the mountains to obtain a laminate. The corrugated fiber material and the flat fiber material were alternately laminated in the manner such that the air passages are aligned in the same direction, thereby obtaining a corrugated honeycomb substrate shown in FIG. 1 and FIG. 2 with a core pitch (p in FIG. 2) of 2.8 mm and a mountain height (h in FIG. 2) of 1.3 mm.

Preparation of Slurry Containing Ion-Exchange Resin Powder

A slurry containing ion-exchange resin powder was prepared by mixing strongly acidic cation-exchange resin powder with an average particle diameter of 20 μm and an ion-exchange capacity of 5.0 meq/g (DIAION manufactured by Mitsubishi Chemical Corp.), silica sol ("Snowtex" (solid components: 20 wt %) manufactured by Nissan Chemical Co., Ltd.) as an adhesive, and water in a proportion to make the ratio of the solid components of the cation-exchange resin powder to silica sol 8:2 and the total amount of the cation-exchange resin powder and the solid components in silica gel 30 wt %.

Preparation of Chemical Filter

The ion-exchange resin powder was caused to be supported by the fiber supporting body by dipping the fiber supporting body with a corrugated honeycomb structure in the slurry in a container for 60 seconds (first dipping treatment), removing the fiber supporting body from the slurry, and drying at 80° C. for 60 minutes. This dipping treatment and drying were repeated once again (second dipping treatment) to cause the ion-exchange resin powder to be supported on the fiber supporting body, thereby obtaining the chemical filter A.

The chemical filter A was cut to a size of 100 mm (length)×100 mm (width)×40 mm (thickness) and inserted into an aluminum frame.

The ion exchange capacity per unit volume of the chemical filter A was 850 eq/m$^3$ and the amounts of the ion-exchange fiber and the ion-exchange resin powder per unit volume of the chemical filter A were respectively 60 kg/m$^3$ and 146 kg/m$^3$. The ion exchange capacity per unit volume of the chemical filter A was calculated from the total amount of the chemical filter A, which is the total of the value obtained by multiplying the content of the ion-exchange fiber in the chemical filter A by the ion-exchange capacity of the ion-exchange fiber and the value obtained by multiplying the content of the ion-exchange resin powder by the ion-exchange capacity of the ion-exchange resin powder.

Measurement of Properties

Figure 3:
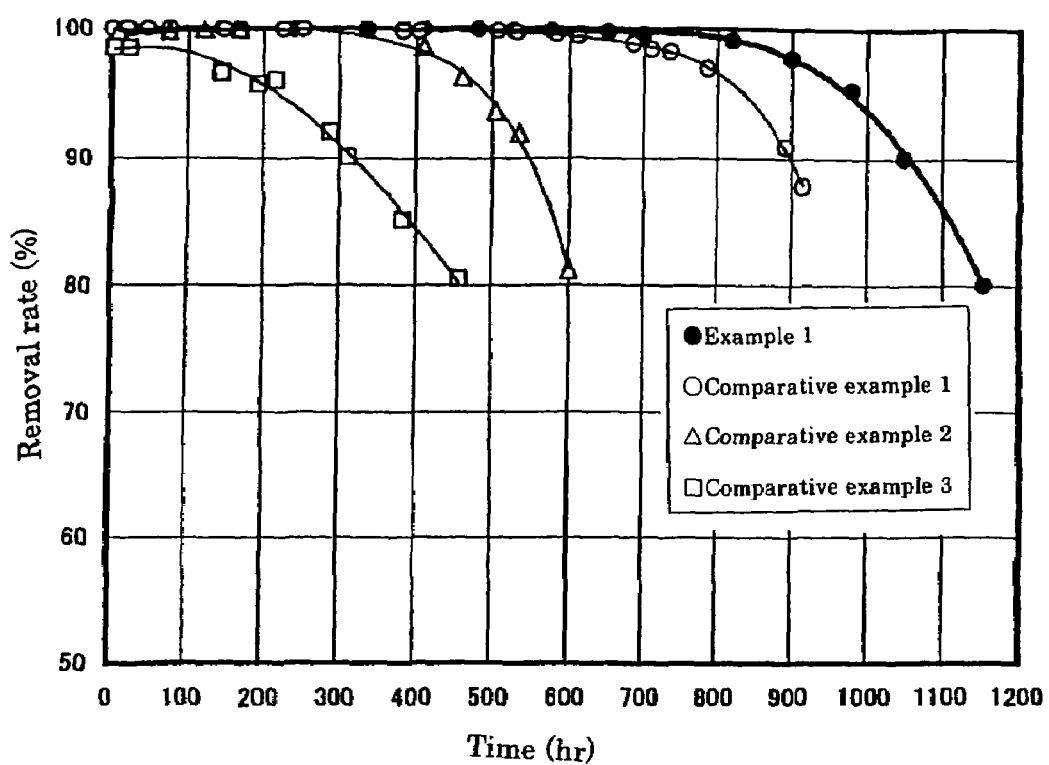
FIG. 3 is a graph showing the change over time of the ammonia gas removal rate.

The change in the ammonia removal rate over time and the life of the chemical filter A were determined under the following conditions. Although the ammonia concentration causing problems in a clean room in practice is in the order of several tens of μg/m$^3$, the ammonia concentration of 240 μg/m$^3$ was used in the accelerated test. The results are shown in Table 1 and FIG. 3. The life of the chemical filter A supporting the ion-exchange resin powder was 1050 hours. The pressure loss of the chemical filter A determined under these conditions was 27 Pa. The period of time elapsed up to the time when the ammonia removal rate was decreased to as low as 90% was regarded as the life of the chemical filter.

Test Conditions
    Composition of feed gas: air containing 240 μg/m³ of ammonia
    Temperature and humidity of the feed gas: 23° C., 50% RH
    Target gas to be removed: ammonia
    Gas feed rate: 0.5 m/sec Comparative Example 1

A commercially available chemical filter, "FILTORAY" manufactured by Toray Industries, Inc. (pitch: 3.3 mm, mountain height: 1.1 mm) with a size of 100 mm (length)× 100 mm (width)×40 mm (thickness), prepared from a flat fiber material similar to a filter paper, which was prepared from a multiple center island-type ion-exchange fiber containing cation-exchange groups (ion-exchange capacity: 3.5 meq/g) and heat-sealed fiber by paper milling, by corrugating the flat fiber material and laminating the corrugated fiber material thus obtained with the flat fiber material by alternately superposing them, was used as the chemical filter B. The ion exchange capacity per unit volume of the chemical filter B was 700 eq/m³ and the amount of the ion-exchange fiber per unit volume of the chemical filter B was 200 kg/m³.

Measurement of Properties

The experiment was carried out in the same manner as in Example 1 except that the chemical filter B was used instead of the chemical filter A. The results are shown in Table 1 and FIG. 3. The life of the chemical filter B was 900 hours. The pressure loss of the chemical filter B was 27 Pa.

Comparative Example 2

A commercially available chemical filter (length: 100 mm, width: 100 mm, thickness: 45 mm), "EPIX" manufactured by Ebara Corp., prepared by folding a non-woven fabric made from an organic polymer by irradiating the polymer with ionizing radiation followed by grafting cation-exchange groups (sulfonic acid groups, ion-exchange capacity: 3.0 meq/g) was used as the chemical filter C. The ion exchange capacity per unit volume of the chemical filter C was 330 eq/m³ and the amount of the ion-exchange fiber per unit volume of the chemical filter C was 110 kg/m³.

Measurement of Properties

The experiment was carried out in the same manner as in Example 1 except that the chemical filter C was used instead of the chemical filter A. The results are shown in Table 1 and FIG. 3. The life of the chemical filter C was 550 hours. The pressure loss of the chemical filter C was 53 Pa.

Comparative Example 3

A commercially available honeycomb chemical filter D (length: 100 mm, width: 100 mm, thickness: 40 mm), "Pure Act" manufactured by Nippon Puretech Co., Ltd., prepared from activated carbon fiber to which phosphoric acid was attached was used.

Measurement of Properties

The experiment was carried out in the same manner as in Example 1 except that the chemical filter D was used instead of the chemical filter A. The results are shown in Table 1 and FIG. 3. The life of the chemical filter D was 300 hours. The pressure loss of the chemical filter D was 20 Pa.

TABLE 1

|  | Example 1 | Comparative Example 1 | Comparative Example 2 | Comparative Example 3 |
|---|---|---|---|---|
| Ion exchange capacity per unit volume (eq/m³) | 850 | 700 | 330 | —[3] |
| Amount of ion exchanger per unit volume (kg/m³) | fiber: 60[1] resin: 146[2] | 200 | 110 | —[3] |
| Life of chemical filter (hours) | 1050 | 900 | 550 | 300 |
| Pressure loss (Pa) | 27 | 27 | 53 | 20 |

[1]Fiber: the amount of ion-exchange fiber per unit volume
[2]Resin: the amount of ion-exchange resin powder per unit volume
[3]Not measured because the chemical filter did not contain ion-exchange fiber.

INDUSTRIAL APPLICABILITY

The chemical filter of the present invention can be used for air cleaning in clean rooms and apparatuses in facilities for manufacturing semiconductors, liquid crystals, and precision electronic parts in which ionized gaseous pollutants are produced.

The invention claimed is:

1. A chemical filter supporting an ion-exchange resin comprising a fiber supporting body containing ion-exchange fiber and ion-exchange resin powder supported on the fiber supporting body, wherein the amount of the ion-exchange resin powder supported is 50-200 kg/m³.

2. The chemical filter according to claim 1, wherein the amount of the ion-exchange fiber in the fiber supporting body is 20-80 wt %.

3. The chemical filter according to claim 1, wherein the ion-exchange capacity of the ion-exchange fiber is 1-5 meq/g.

4. The chemical filter according to claim 1, wherein the average particle diameter of the ion-exchange resin powder is 1-150 μm.

5. The chemical filter according to claim 1, wherein the ion-exchange capacity of the ion-exchange resin powder is 1-10 meq/g.

6. The chemical filter according to claim 1, wherein the fiber supporting body has a corrugated-honeycomb structure.

7. A method for manufacturing a chemical filter supporting an ion-exchange resin comprising blowing a slurry containing ion-exchange resin powder onto a fiber supporting body which contains ion-exchange fiber, wherein the amount of the ion-exchange resin powder supported is 50-200 kg/m³.

8. A method for manufacturing a chemical filter supporting an ion-exchange resin comprising dipping a fiber supporting body which contains ion-exchange fiber in a slurry containing ion-exchange resin powder, wherein the amount of the ion-exchange resin powder supported is 50-200 kg/m³.

9. The method for manufacturing the chemical filter according to claim 7 or claim 8, wherein the average particle diameter of the ion-exchange resin powder is 1-150 μm.

10. The method for manufacturing the chemical filter according to claim 7 or claim 8, wherein the ion-exchange capacity of the ion-exchange resin powder is 1-10 meq/g.

11. A chemical filter supporting an ion-exchange resin comprising a fiber supporting body containing ion-exchange fiber and ion-exchange resin powder supported on the fiber supporting body, wherein the ion-exchange capacity of the ion-exchange resin powder is 1-10 meq/g.

12. The chemical filter according to claim 11, wherein the amount of the ion-exchange fiber in the fiber supporting body is 20-80 wt %.

13. The chemical filter according to claim 11, wherein the ion-exchange capacity of the ion-exchange fiber is 1-5 meq/g.

14. The chemical filter according to claim 11, wherein the average particle diameter of the ion-exchange resin powder is 1-150 μm.

15. The chemical filter according to claim 11, wherein the fiber supporting body has a corrugated-honeycomb structure.

* * * * *